United States Patent [19]

Morita et al.

[11] Patent Number: 4,781,260

[45] Date of Patent: Nov. 1, 1988

[54] FRAMEWORK STRUCTURE FOR VEHICLES

[75] Inventors: Shigeru Morita; Kenkichi Nozaka; Yosihiro Kawahara, all of Osaka, Japan

[73] Assignee: Kubota Ltd., Osaka, Japan

[21] Appl. No.: 42,214

[22] Filed: Apr. 24, 1987

[30] Foreign Application Priority Data

Jun. 30, 1986 [JP] Japan ................................ 61-154836

[51] Int. Cl.[4] ........................ B62D 33/06; B62D 49/00

[52] U.S. Cl. ................................ 180/89.12; 180/311; 296/190; 280/785; 280/756

[58] Field of Search ............................. 180/89.12, 311; 296/188, 190; 280/756, 785, 795

[56] References Cited

U.S. PATENT DOCUMENTS

| | | | |
|---|---|---|---|
| 2,189,139 | 2/1940 | Fox | 280/795 |
| 2,381,729 | 8/1945 | Dunham et al. | 414/635 |
| 2,805,887 | 9/1957 | Selby | 280/756 |
| 4,040,640 | 8/1977 | Begg | 280/785 |
| 4,157,125 | 6/1979 | Bushell et al. | 180/212 |
| 4,168,087 | 9/1979 | Paplaski et al. | 280/785 |
| 4,272,221 | 6/1981 | Oswald et al. | 414/634 |
| 4,692,086 | 9/1987 | Morita et al. | 280/759 |

FOREIGN PATENT DOCUMENTS

| | | | |
|---|---|---|---|
| 2165265 | 7/1973 | Fed. Rep. of Germany | 280/756 |
| 2203980 | 8/1973 | Fed. Rep. of Germany | 280/756 |
| 985946 | 7/1951 | France | 280/795 |

*Primary Examiner*—Kenneth R. Rice
*Attorney, Agent, or Firm*—Birch, Stewart, Kolasch & Birch

[57] ABSTRACT

A pair of reinforcing frames each comprising front and rear two dividable segments are attached to opposite sides of a vehicle body which comprises an engine, a clutch housing and a transmission case directly joined together into an assembly. Front and intermediate gate frames provided over the vehicle body at its front and intermediate portions astride thereof are secured to the reinforcing frames. Upper component members of the vehicle and a four-post protective frame are attached to the front and intermediate gate frames. The front and intermediate gate frames include upright members each made of a pipe of square to rectangular cross section. The members attached to the gate frames include front wheel fenders, a front cover, a bonnet, a fuel tank and a partition plate.

12 Claims, 4 Drawing Sheets

FRAMEWORK STRUCTURE FOR VEHICLES

FIELD OF THE INVENTION AND RELATED ART STATEMENT

The present invention relates to a framework structure for vehicles which are adapted to run chiefly on irregular surfaces of the ground with a working device attached to the front or rear portion of the vehicle body.

Body structures of vehicles include those of the assembly type comprising an engine, a clutch housing and a transmission case which are joined together as arranged longitudinally of the vehicle, and those of the frame type wherein these components are attached to a frame. The structure of the former assembly type is primarily employed for running on the untilled ground having many surface irregularities since the vehicle body is smaller in the space occupied and compacter, has a larger ground clearance and affords a wider field of view. The present invention also provides a vehicle body structure of the assembly type.

When the vehicle of the assembly-type body structure is used for performing work with a lift, loader or agricultural working implement attached to its front or rear portion, the vehicle body is heavily loaded with the working device and subjected to a great bending force which could cause damage to the joint of the vehicle body.

To reduce the likelihood of damage to the vehicle body, some vehicles are provided with a pair of elongated reinforcing members connected to the body on opposite sides thereof and extending longitudinally of the body, with the front and rear portions of the frames interconnected, as disclosed in the specification of my U.S. patent application Ser. No. 801,338, filed on Nov. 25, 1985 and now U.S. Pat. No. 4,692,086.

The reinforcing frames of the application still remain to be improved although contributing to the reinforcement of the vehicle body to some extent, while the frames do not serve to attach other components of the vehicle, such as bonnet and front and rear fenders, to the vehicle body. Thus, the rigid frames are not effectively utilized.

The vehicles of the assembly-type body structure include farm tractors having a protective frame, which requires elongated posts extending upright from the vehicle body. The lower portions of these posts are not utilized for attaching other components of the vehicle to its body.

OBJECTS AND SUMMARY OF THE INVENTION

An important object of the present invention is to provide a framework structure which comprises a pair of reinforcing frames connected to the body of a vehicle on opposite sides thereof respectively, and a front gate frame and an intermediate gate frame connected to the front portion of each reinforcing frame and a longitudinally intermediate portion thereof respectively to reinforce the connection of the reinforcing frames to the vehicle body and also to make it possible to attach front and intermediate components of the vehicle and a four-post protective frame to the vehicle body with use of the two gate frames.

Another important object of the present invention is to interconnect the reinforcing frames and also secure these frames to the vehicle body at the front, intermediate and rear portions of the frames to give improved strength to the resulting assembly and to prevent the vehicle body from breaking.

Another important object of the present invention is to fabricate the gate frames from a pipe of square to rectangular cross section to give improved strength and enhanced rigidity to the gate frames.

Another important object of the present invention is to attach the lower portions of the posts of the protective frame to the upper portions of the front and intermediate gate frames to shorten the posts.

Another important object of the present invention is to attach front components of the vehicle, such as front wheel fenders and front cover, to the front gate frame to connect these components to the vehicle body with improved strength and ease.

Another important object of the present invention is to attach intermediate components of the vehicle, such as bonnet, partition plate and fuel tank, to the intermediate gate frame to connect these components to the vehicle body with improved strength and ease.

BRIEF DESCRIPTION OF THE DRAWINGS

The accompanying drawings show an embodiment of the invention.

DESCRIPTION OF THE PREFERRED EMBODIMENT

Figure 1:
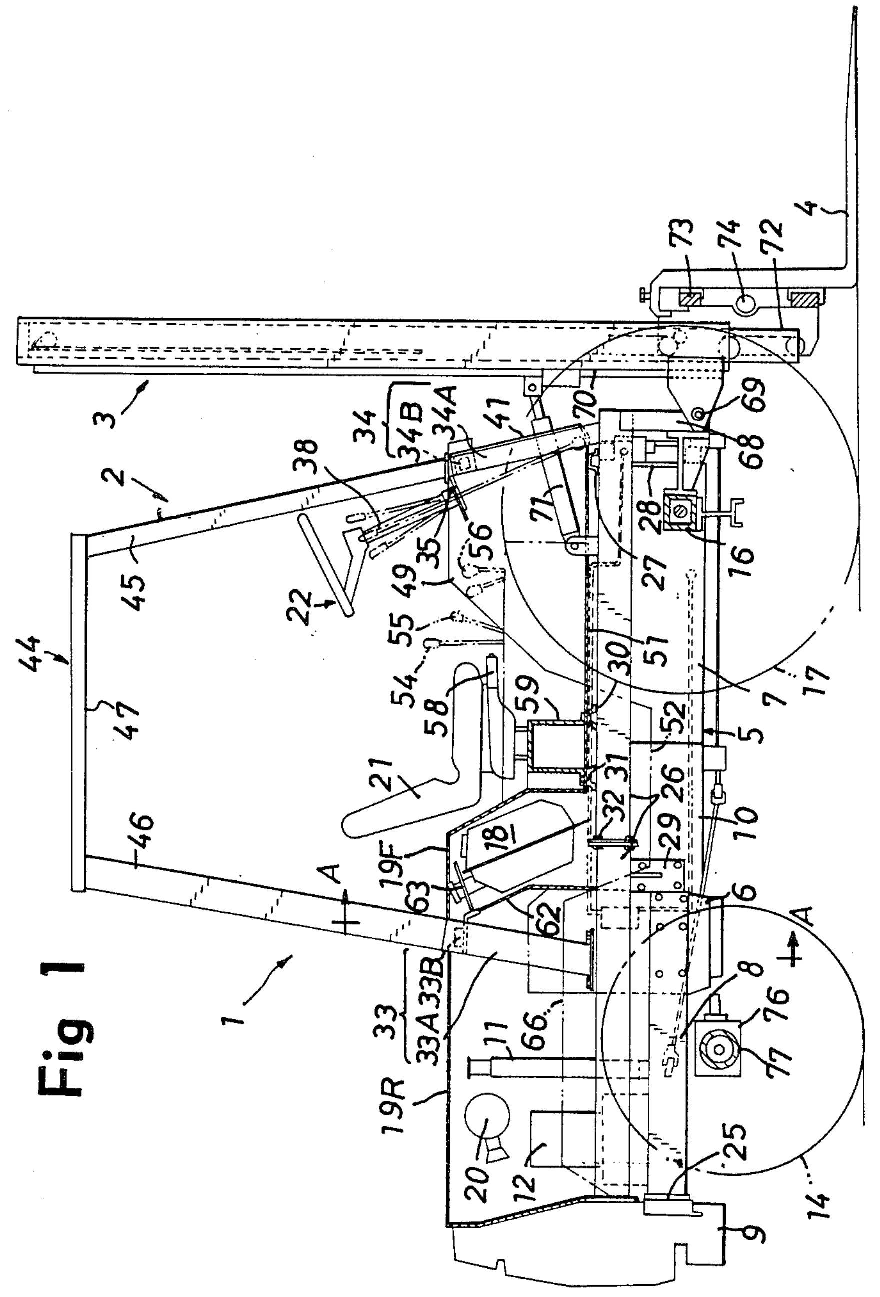
FIG. 1 is a side elevation partly in section and showing a vehicle equipped with a lift device.

An embodiment of the invention will be described below with reference to the drawings.

Referring to FIGS. 1 to 5, a vehicle 2 is equipped with a lift device 3 at its front portion to serve as a load handling vehicle 1. The lift device 3 is used chiefly on untilled ground and has a working implement 4 such as a fork or bucket.

The vehicle 2 has an assembly-type body 5 which comprises an engine 6, a clutch housing 10, a transmission case 7, etc. arranged in a row lontidudinally of the vehicle and joined together with bolts. A pair of opposed rear axle frames 8 extends rearward from the engine 6. A rear weight 9 serving also as a grille is fastened to the rear ends of the frames 8.

A radiator 11, a battery 12, etc. are mounted on the pair of rear axle frames 8. A power steering cylinder 13 is disposed inside the frames 8. A rear wheel 14 is supported by each rear axle frame 8 by means of a differential gear 76, a rear axle case 77, etc. A brake case 15 and a front axle case 16 are secured to each side of the transmission case 7 at its front portion. A front wheel 17 is rotatably supported by the case 16.

A fuel tank 18 is disposed above a longitudinally intermediate portion of the vehicle body 5. The fuel tank 18, the engine 6, the radiator 11, the battery 12, an air cleaner 20, etc. are covered with a bonnet 19, in front of which a seat 21 is disposed. To the front of the seat 21, a steering assembly 22 is provided above the front portion of the body 5.

A pair of reinforcing frames 26 arranged at opposite sides of the body 5 externally thereof extend approximately over the entire length of the body and are positioned toward the top side of the body 5. The reinforcing frames 26 are interconnected at its front portion by a front connector 27 in the form of a U-shaped angle member and also by another front member 28 in the form of an L-shaped angle member and are connected to the vehicle body 5 by the connector 28. The rear ends of the reinforcing frames 26 are interconnected by a rear connector 25, which is secured to the rear ends of the rear axle cases 8 and which has fastened thereto the rear weight 9 with bolts. A bracket 29 is fixed to a longitudinally intermediate portion of each reinforcing frame 26 and to the side of the body 5 with bolts. Connectors 30, 31 made of a U-shaped angle member interconnect the frames 26 at intermediate portions thereof which are to the front of the brackets 29. The connectors 30, 31 are placed on the vehicle body 5.

The opposed reinforcing frames 26 are assembled into a strong and rigid framework by the front connectors 27, 28, intermediate connectors 30, 31 and rear connector 25. The frames 26 are further firmly secured to the body 5 by the front and rear connectors 28, 25 and the brackets 29. Thus, these members prevent fracture of the body 5.

Each of the reinforcing frames 26 is divided into two segments in the vicinity of the bracket 29, more specifically, between the bracket 29 and the intermediate connector 31. The divided ends are formed with flanges **26*a*, 26*b*, which are joined together with bolts 32. This makes the frames 26 easy to install and remove, further rendering the vehicle body 5 easy to assemble and disassemble. The flange joint is positioned between the joint of the engine 6 and the clutch housing 10 and the joint of the housing 10 and the transmission case 7 so that the buckling stress acting on the body 5 and the frames 26** will not concentrate at the same position.

Gate frames 34, 33 are provided over the front portion of the vehicle body and a longitudinally intermediate portion thereof, respectively, astride thereof and are secured to the reinforcing frames 26 to give improved connection strength. The front gate frame 34 comprises a pair of opposed upright members 34A extending upwardly rearward and a top member 34B interconnecting their upper portions. Each of the members 34A, 34B is made of a pipe of square cross section. The foot of the upright member 34A is welded or bolted to the outer side of the corresponding frame 26. The upright member 34A has a flange 34C at its upper end. The flange 34C is positioned above the top member 34B.

The top member 34B of the front gate frame 34 is fixedly provided at the lengthwise midportion thereof with a support plate 35 supporting a steering wheel post 36 of the steering assembly 22. Three lift operation levers 38 are pivotably supported by a support bracket 37 on the top member 34B. These operation levers 38 are used for tilting the lift device 3, moving the fork 4 upward or downward and moving the fork 4 sideways and are coupled by rods 39 to a control valve 40 attached to the front connector 28.

A front cover 41 provided between the opposed upright posts 34A covers the front side of the steering assembly 22 in front of the seat 21 and extends from the upper surface of the top member 34B to the front connector 27. The cover 41 covers the upper surface of the support plate 35 and is formed with guides 42 for the lift operation levers 38.

Indicated at 44 is a four-post safety frame for protecting the operator seated in the seat 21. The safet frame 44 comprises four posts, i.e. front posts 45 and rear posts 46, and a top frame 47 fixed to the upper ends of these posts. The front posts 45 are inclined upwardly rearward, and the rear posts 46 upwardly forward. The front post 45 is made of a square pipe substantially identical with the upright member 34A in cross section. The rear post 46 is made of a square pipe substantially identical with the upright member 33A (to be described later) in cross section. The four posts 45, 46 are welded to the top frame 47 or removably fixed thereto with bolts. The front post 45 has at its lower end a flange **45*a*, which is removably fastened to the upper end flange 34C of the upright member 34A of the front gate frame 34 with bolts. Thus, the upright member 34A serve the function of the lower post of the safety frame 44, consequently shortening the front post 45**.

While the flanges **34C, 45*a* are fastened together with four bolts 48, two of these bolts also fasten the front cover 41 in contact with the inner side lower surface of the flange 34C, while the other two bolts also fasten a front wheel fender 49 in contact with the outer side lower surface of the flange 34C. In this way, opposite front wheel fenders 49 are fixed to the front gate frame 34 and made less prone to vibration. The front wheel fender 49 covers the front wheel 17** over the front and rear sides thereof.

Figure 6:
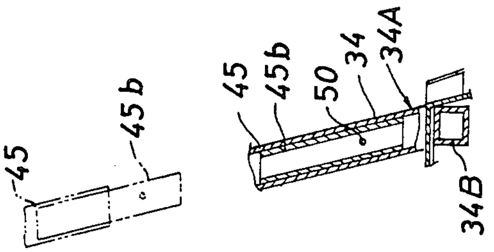
FIG. 6 is a fragmentary sectional view showing a protective frame front post as removably connected to a front gate frame.
Figure 2:
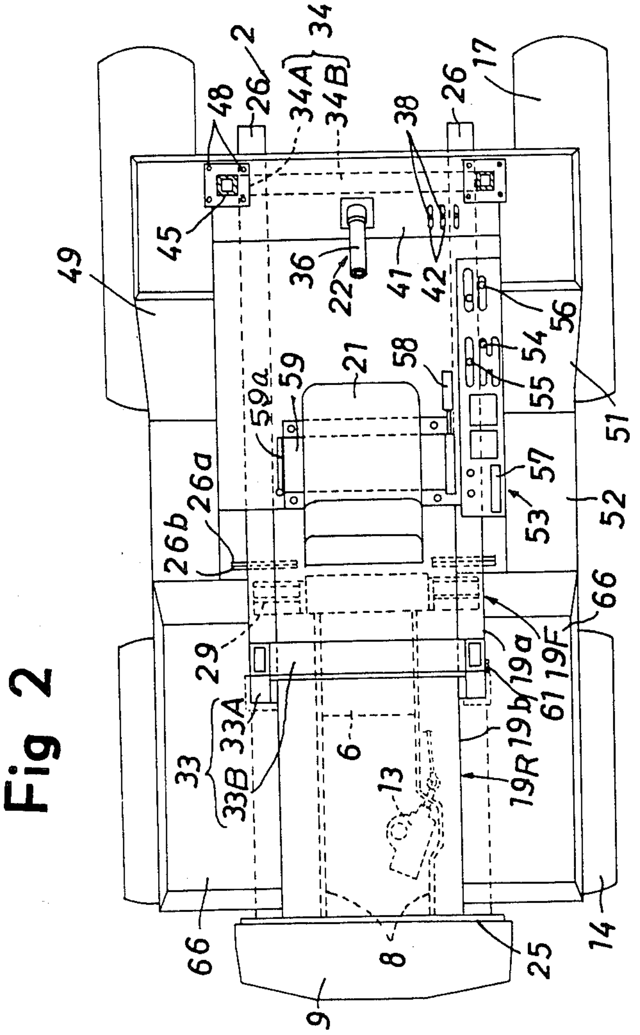
FIG. 2 is a plan view showing the vehicle.

Each upright member 34A of the front gate frame 34 can be connected to the front post 45 of the protective frame 44 in the mode shown in FIG. 6 without forming the flange 34C on the upper portion of the upright member 45A. The upright member 34A has a socket portion **34*d* in the form of a square tube and projecting upward through the front fender 49. The front post 45 has a spigot portion 45*b* made of a square pipe and projecting from the lower end of the post. The spigot portion 45*b* is inserted in the socket portion 34*d* and fastened thereto with a bolt 50, whereby the front post 45 is connected to the upright member 34A** in alignment therewith.

Indicated at 51 is a floor sheet extending between and over the pair of reinforcing frames 26 and further connected at its opposite sides to the oppposed fenders 49. A pair of opposite steps 52 are positioned in the rear of fenders 49.

Disposed between the seat 21 and the right fender 49 is an operation panel 53 which is positioned above and fixed to the floor sheet 51. A door may be provided above the right step, with the operation panel 53 attached to its upper portion. The operation panel 53 is provided with a main speed change lever 54, a secondary speed change lever 55, a forward-reverse change lever 56, an easy checker 57, meters, switches, etc.

Figure 3:
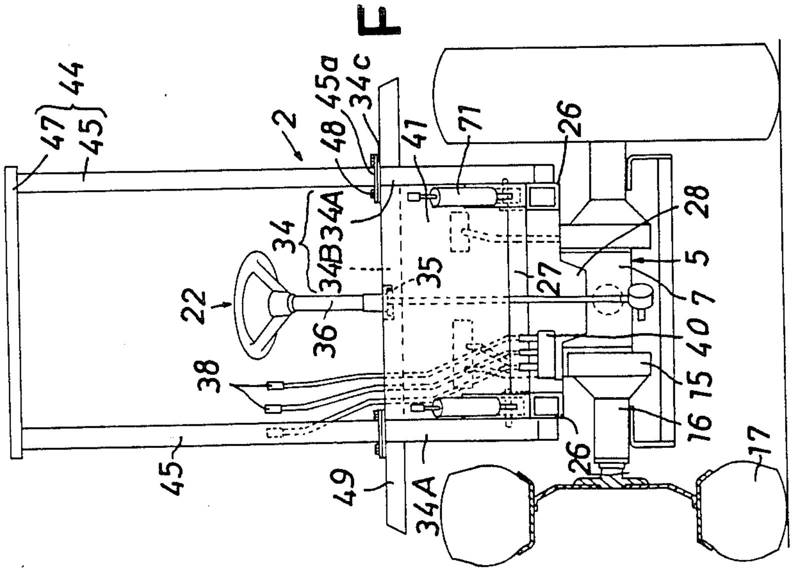
FIG. 3 is a front view partly in section and showing the vehicle.
Figure 4:
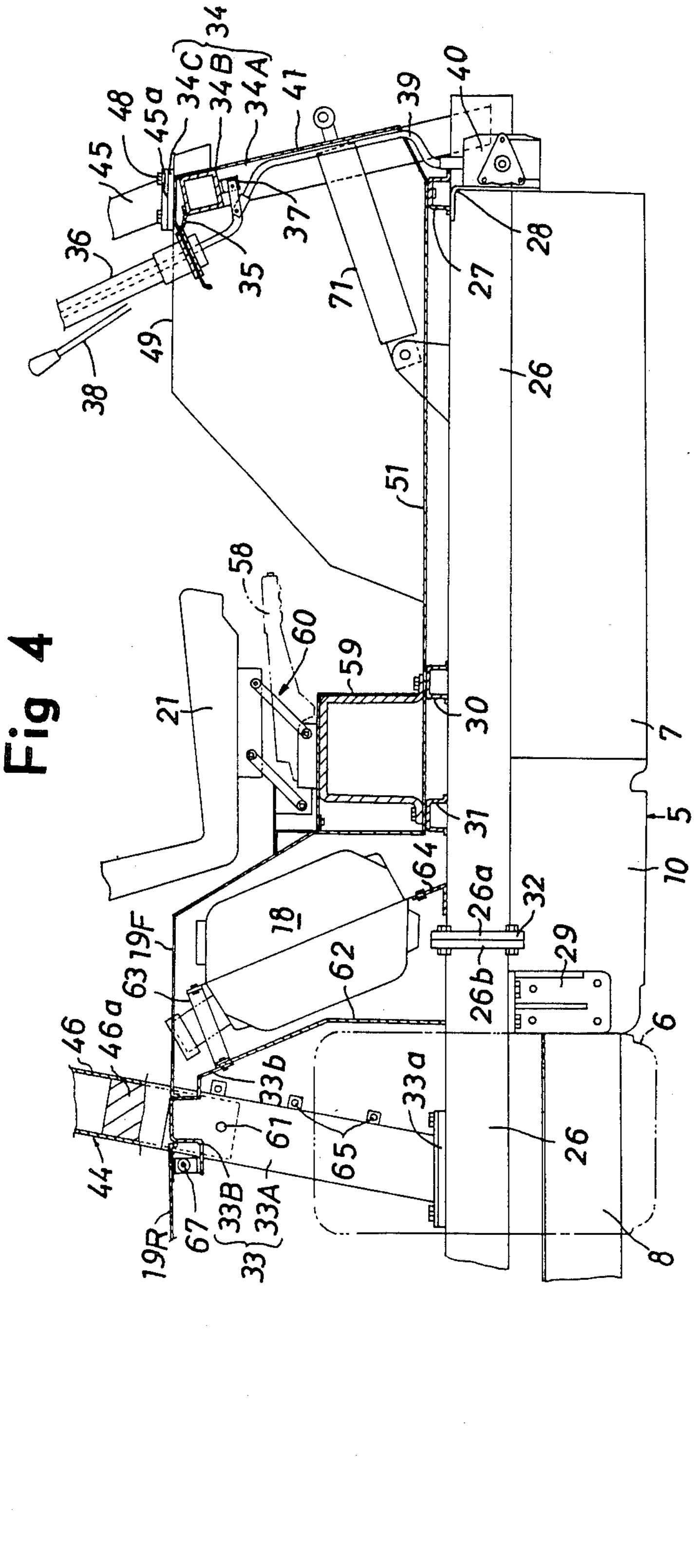
FIG. 4 is an enlarged side elevation partly in section and showing a vehicle framework structure in greater detail.

Although the speed change levers 54, 55, 56, etc. can be arranged beside the operations levers 38, these levers, which are not used during work, would interfere with the forwardly downward field of view if so arranged. These levers are easier to manipulate when disposed at one side of the seat 21. Provision of the panel 53 beside the seat 21 further simplifies the arrangement around the steering assembly 22, further making it possible to position the top of the front cover 41 at a lower level. With the present embodiment, the upper surface of the front cover 41 is at such a level as to be substantially flush with the upper surfaces of the front wheel fenders 51 as seen in FIG. 3, affording a sufficiently wide fowardly downward field of view.

The seat 21 is mounted on a box 59 provided on the floor sheet 51 between the steering assembly 22 and the bonnet 19. The floor sheet 51 is provided on the front and intermediate connectors 27, 30 and 31 on the reinforcing frames 26. A plate of inverted U-shaped cross section fixedly mounted on the intermediate connectors 30, 31 and the floor sheet 51 form the box 59. The seat 21 is mounted on the box 59 by a support assembly 60 by which the position of the seat is adjustable vertically and also longitudinally of the vehicle. One side of the box 59 is closed with the operation panel 53, and the other side thereof with an openable closure 59*a* so that tools and small articles can be accommodated in the box. A parking brake lever 58 is mounted on the box 59.

The intermediate gate frame 33 comprises a pair of opposed upright members 33A inclined upwardly forward and a top member 33B interconnecting the upper portions of the members 33A. Each upright member 33A is made of a square pipe and has at its foot portion a flange 33*a* which is removably fastened to the upper side of the reinforcing frame 26 with bolts. The upright member 33A has at its upper end a socket portion 33*d*. Each rear post 46 of the safety frame 44 has at its lower end a spigot portion 46*a* formed by fixedly inserting a member of square cross section into the end. The spigot portion 46*a* is removably fitted in the socket portion 33*d*, with a bolt (or pin) 61 inserted through these portions, whereby the safety frame 44 is connected to the intermediate gate frame 33. The upright member 33A serves the function of the lower post of the frame 44, thereby permitting the use of the rear post 46 which is shortened. With the front and rear posts 45, 46 made removable from the front and rear gate frames 34, 33, the safety frame 44 is simple in construction and easy to install or remove.

The top member 33B is made of an angle member having an inverted U-shaped cross section and is welded at its opposite ends to the opposed upright members 33A. The front side of the member 33B slightly extends forwardly downward to provide an attaching portion 33*b*. A partition plate 62 covering the front side of the engine 6 is fixedly connected between the attaching portion 33*b* and the vehicle body 5, thus separating the fuel tank 18 from the engine 6 and dividing the interior of the bonnet 19 into front and rear portions. Also attached to the portion 33*b* is an upper bracket 63 connected to the upper portion of a flange 18*a* extending upward and downward from the fuel tank 18. The lower ends of the partition plate 62 and the flange 18*a* are secured to the vehicle body 5 or the reinforcing frames 26, using lower brackets 64 for the latter end.

The bonnet 19 is divided into two portions 19F and 19R in front and rear of the intermediate gate frame 33. The upper surfaces of the front and rear bonnet portions 19F, 19R are substantially flush with the upper surface of the top member 33B which is exposed from between these bonnet portions 19F, 19R. Each side wall 19*a* of the front bonnet portion 19F is substantially flush with the outer surface of the upright member 33A adjacent thereto. Each side wall 19*b* of the rear bonnet portion 19B is in contact with the inner surface of the upright member 33A, or the inner surfaces of the wall 19*b* and the member 33A are substantially flush with each other. The width of the front bonnet portion 19F is larger than that of the rear bonnet portion 19R by the widths of the opposed upright members 33A.

The front bonnet portion 19F is attached to each upright member 33A by lugs 65 or the like projecting forward from the member 33A. The rear bonnet portion 19R has a front upper end supported by the rear portion of th top member 33B with a pivot member 67 and a lower end removably fixed to the vehicle body 5, the reinforcing frame 26 or the like. Each rear wheel fender 66 is connected to the reinforcing frame 26, the rear bonnet portion 19R, the step 52, etc.

Figure 8:
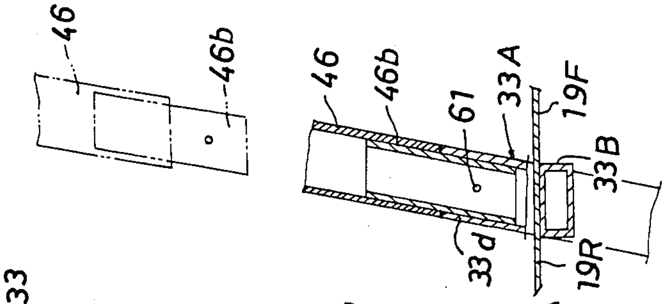
FIG. 8 is an enlarged view in section taken along the line B—B in FIG. 7.
Figure 5:
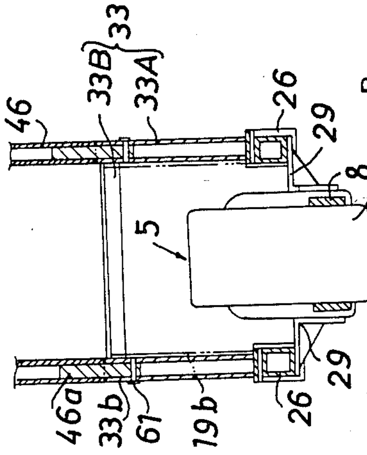
FIG. 5 is a view in section taken along the line A—A in FIG. 1.
Figure 7:
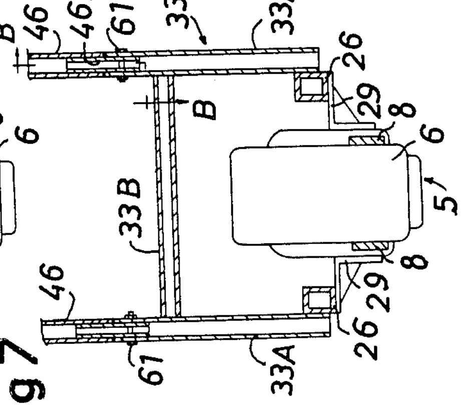
FIG. 7 is a sectional view showing a modified intermediate gate frame.

As seen in FIGS. 7 and 8, the top member 33B of the intermediate gate frame 33 may be made of a pipe of square cross section, with the rear end of the front bonnet portion 19F lapping over the front end of the rear bonnet portion 19R and with the lap secured to the upper side of the member 33B Each upright member 33A shown in FIGS. 7 and 8 has its lower end fixed to the outer side of the reinforcing frame 26. Further the lower-end spigot portion 46*b* of the rear post 46 of the safety frame 44 is in the form of a pipe having a square cross section.

With reference to FIG. 1, the vehicle 2 is provided at its front portion with a pair of supports 68 which are connected to the reinforcing frames 26 and the front axle cases 16. Each stationary mast 70 of the lift device 3 is pivotably supported by a lateral pin 69 on the support 68. A pair of opposed tilting cylinders 71, pivoted to the reinforcing frames 26, each have a piston rod having its forward end connected to the stationary mast 70 to tilt the mast 70. The staionary masts 70 have inside thereof vertically movable masts 72 which are provided with a lift frame 73 supporting the fork 4 thereon. The fork 4 is adjustingly shiftable by a cylinder 74 relative to the lift frame 73 transversely of the vehicle.

According to the embodiment described, the pair of reinforcing frames 26, the front and intermediate gate frames 34, 33, etc. form a framework for the vehicle. While the vehicle 2 is equipped with the lift device 3, a loader or a working device such as a tiller or plow may alternatively be attached to the front or rear portion of the vehicle.

While the term "square" is herein used with reference to the gate frames and the safety or protective frame, pipes of rectangular cross section are similarly usable for these components as will be apparent from some of the drawings.

What is claimed is:

1. A framework structure for a vehicle having a vehicle body, the vehicle body including an engine, a clutch housing and a transmission case joined to form a monocoque body arranged longitudinally comprising:

a pair of front wheels provided at opposite sides of a front portion of the vehicle body and operatively connected to a front axle case, a rear axle frame attached to a rear portion of the vehicle body, a pair of rear wheels each attached to the rear axle frame and operatively connected to a rear axle case, a steering assembly disposed between opposite front wheel fenders provided at the front portion of the vehicle body, a bonnet covering the engine carried on the vehicle body in its rear portion, and a driver's seat mounted on the vehicle body and interposed between the bonnet and the steering assembly;

said framework structure being characterized in that a pair of elongated reinforcing frames are positioned longitudinally along the body at opposite sides thereof, respectively, to cover the longitudinal length from the front end to the rear end of the body, said pair of reinforcing frames are interconnected at a front, intermediate and rear portions thereof by connectors, the front connector, the rear connector and a bracket provided in a middle of the reinforcing frames are connected to the body at a front and intermediate portions longitudinally of the body;

a front gate frame and an intermediate gate frame are positioned astride and transversely arranged relative to said reinforcing frames and comprise a pair of side upright members and top members, the pair of side upright members are secured at open end to the reinforcing frames;

upright members of the front gate include top ends being adjustable heightwise almost equal to top of the fender;

upright members of the intermediate gate include top ends being adjustable heightwise almost equal to top of the bonnet and respective gates are attached to vehicular elements located above the body; and a safety frame is formed by connecting top ends of front and rear posts with a pair of top frames, respectively, down ends of front posts in the safety frame are engaged removably with top ends of the members in the front gate and down ends of rear posts in the safety frame are engaged removably with top ends of the members in the rear gate.

2. A framework structure for vehicle as defined in claim 1, wherein the monocoque body formed connection of the engine, clutch housing and transmission case is equipped with the pair of reinforcing frames positioned along opposite sides thereof; the reinforcing frames are respectively dividable into two pieces longitudinally between a midportion connector and a bracket and wherein the midportion connector is positioned on the body.

3. A framework structure as defined in claim 1 wherein the reinforcing frame provided on each side of the vehicle body composed of the engine, the clutch housing and the transmission case joined together end-to-end comprises dividable front and rear two segments connected together in alignment with each other.

4. A framework structure as defined in claim 3 or 2 wherein the front and rear segments of the reinforcing frame are connected together at a position intermediate between the joint of the engine and the clutch housing and the joint of the cluth housing and the transmission case.

5. A framework structure as defined in claim 1 wherein the vehicle constituting members include a support plate for a steering wheel post of the steering assembly and a support bracket for operation levers, and the support plate and the support brackets are attached to the top member of the front gate frame.

6. A framework structure as defined in claim 1 wherein the vehicle constituting members include the bonnet, and the bonnet comprises divided front and rear two portions, the rear end of the front bonnet portion and the front end of the rear bonnet portion being attached to the intermediate gate frame.

7. A framework structure as defined in claim 1 wherein the intermediate gate frame includes a top member, and the upper surface of the top member is approximately at the same level as the upper surfaces of the front and rear bonnet portions.

8. A framework structure as defined in claim 6 or 7 wherein the top surface of the intermediate gate frame is exposed from between the front and rear bonnet portions and is substantially flush with the upper surfaces of the front and rear bonnet portions.

9. A framework structure as defined in claim 1 wherein the vehicle constituting members include a fuel tank housed in the bonnet at its front portion and a partition plate behind the tank, and the fuel tank has a flange extending upward and downward therefrom, the flange and the partition plate being attached at their upper portions to the intermediate gate frame and at their lower portions to the pair of reinforcing frames.

10. A framework structure for vehicle as defined in claim 1, wherein at least one of top members and the pairs of upright members belonging to the front and intermediate gates are constructed of square pipe.

11. A framework structure for vehicle as defined in claim 1, wherein at least one of the front and intermediate gates comprises the pair of upright members include top ends constructed of square pipe, which ends are subjected to receive linear insertion for engagement with down ends of the posts of the safety frame to be fastened with a fastener.

12. A framework structure for vehicle as defined in claim 1, wherein vehicular elements which are attached to the front gate to define front part of the vehicle, comprise front wheel fenders connected to the frame posts, a front cover connected to the top member to cover a space between the pair of upright members.

* * * * *